Aug. 8, 1933.  A. X. ANDERSON  1,921,901
INSECT DESTROYING DEVICE
Filed April 4, 1932
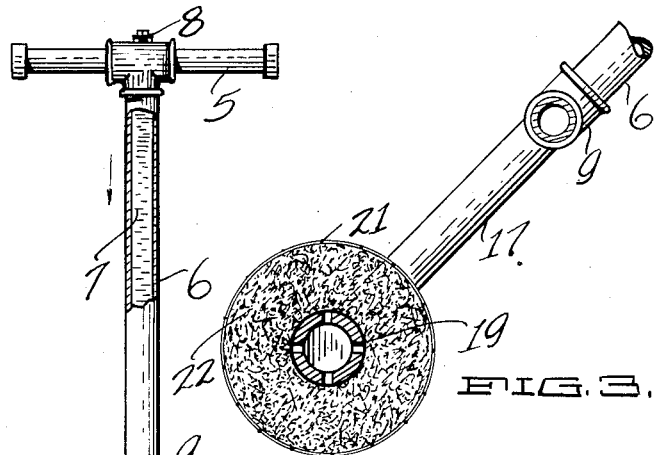
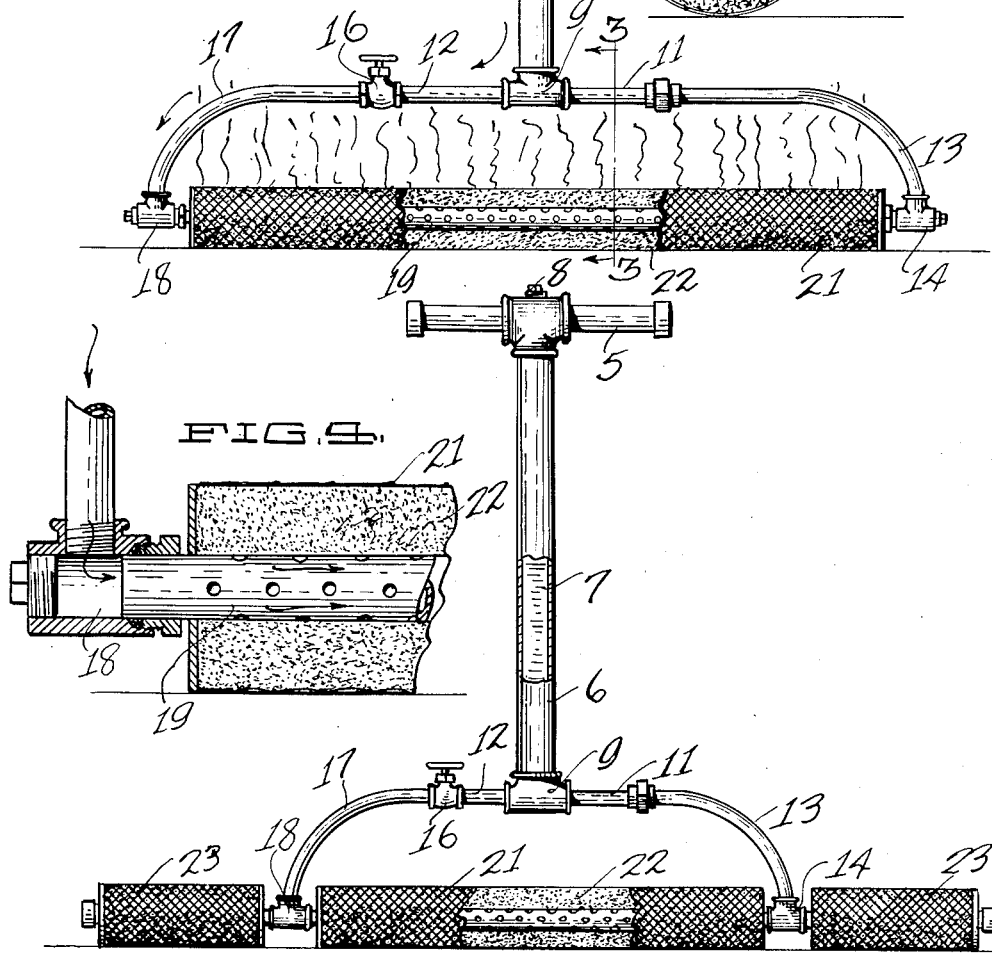
INVENTOR.
ANDREW X. ANDERSON
BY Victor J. Evans & Co
ATTORNEYS.

Patented Aug. 8, 1933

1,921,901

UNITED STATES PATENT OFFICE 1,921,901

INSECT DESTROYING DEVICE

Andrew X. Anderson, San Francisco, Calif.

Application April 4, 1932. Serial No. 603,180

2 Claims. (Cl. 126—271.2)

This invention relates to improvements in devices for destroying ants, bugs and similar insects.

The principal object of the invention is to provide means whereby a flame may be brought into contact with the ground for destroying any life, either animal or vegetable which may be in the path of the device.

A further object is to produce a device of this character which may be operated over a considerable period of time with efficiency.

A further object is to produce a device which is easy to operate and readily transportable.

Other objects and advantages will be apparent during the course of the following description.

In the accompanying drawing forming a part of this specification and in which like numerals are employed to designate like parts throughout the same, Fig. 1 is a front elevation of my device partly broken away in order to show the construction thereof, Fig. 2 is a view similar to Fig. 1 showing a modified form of my device, Fig. 3 is an enlarged detail cross section taken on the line 3—3 of Fig. 1, and Fig. 4 is an enlarged detail cross sectional view showing one of the bearings and the manner in which the fuel is delivered to the roller.

Ants and similar insects are readily destroyed by fire, also their larva and nests may be destroyed through the effective heat. Applicant has devised a roller arrangement similar to a lawn roller, which roller is capable of supporting a blaze while it is being rolled over a surface and it is this blaze which has the destroying effect.

In the accompanying drawing wherein for the purpose of illustration is shown a preferred embodiment of my invention, the numeral 5 designates a handle having a downwardly extending portion 6, which portion serves as a reservoir 7 fillable through the plug 8. This reservoir 7 is connected to a T 9 from which pipes 11 and 12 extend. The pipe 11 is bent as at 13 and carries a bearing 14. The pipe 12 is connected to a valve 16 which valve in turn is connected to a curved pipe 17 which has a bearing 18. The bearings 14 and 18 serve to rotatably hold a perforated pipe 19 which perforated pipe is surrounded by a cage 21 filled with absorbent material 22. In the modified form shown in Fig. 2 the same construction is employed with the exception that end rollers 23 are provided.

The result of this construction is that when the reservoir 7 is filled with oil and the valve 16 opened, oil may flow through the pipe 12, valve 16, pipe 17, bearing 18 and into the pipe 19. This oil then passes to the absorbent material 22 with the result that as soon as this material is saturated it may be ignited and will burn as long as the valve 16 is in open position. It is of course understood that there is no passage from the T 9 into the pipe 11. As soon as the device is ignited it is rolled over a surface where it is desirous of destroying insects which are very susceptible to any flame.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:—

1. In a device of the character described, a handle, a tubular liquid fuel reservoir connected to said handle, pipes extending from said reservoir in opposite directions, the free ends of said pipes curved toward each other, and a roller interposed between the free ends of said pipes, said roller carrying thereon a cage of absorbent material, and means for controlling the flow of the fuel from said reservoir to said absorbent material.

2. In a device of the character described, a handle, a tubular liquid fuel reservoir connected to said handle, pipes extending from said reservoir in opposite directions, the free ends of said pipes curved toward each other, and a roller interposed between the free ends of said pipes, said roller carrying thereon a cage of absorbent material, means for controlling the flow of the fuel from said reservoir to said absorbent material, said means including a valve positioned in one of said pipes connected to said reservoir.

ANDREW X. ANDERSON.